March 31, 1959    W. C. ARRASMITH ET AL    2,880,370
ELECTRIC FLASHER CIRCUIT
Filed March 18, 1957
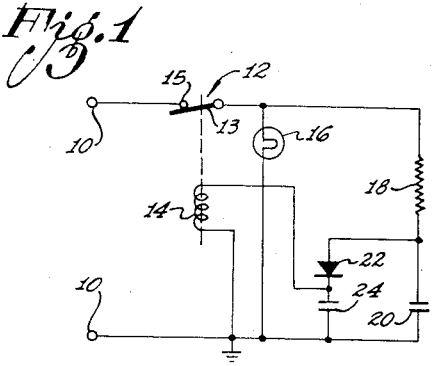
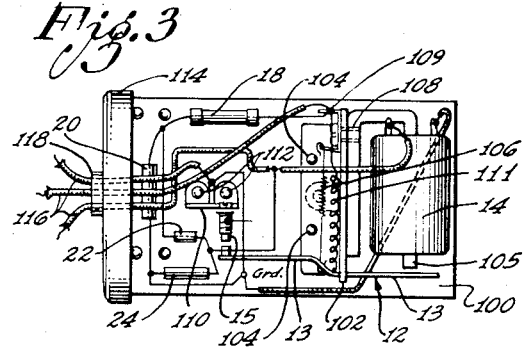
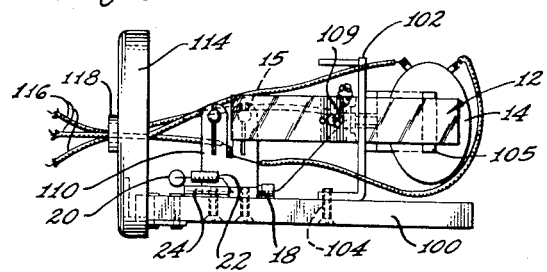
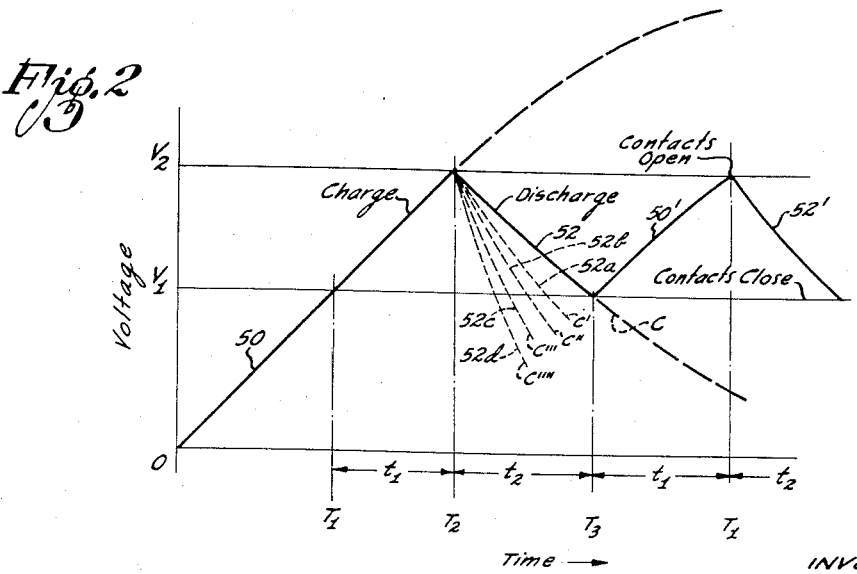
INVENTORS
William C. Arrasmith
Kurt W. Kuhn
By Smyth & Roston
Attorneys

United States Patent Office 2,880,370
Patented Mar. 31, 1959

2,880,370

ELECTRIC FLASHER CIRCUIT

William C. Arrasmith and Kurt W. Kuhn, Los Angeles, Calif., assignors to Radar Relay, Inc., Los Angeles, Calif., a corporation Application March 18, 1957, Serial No. 646,621

7 Claims. (Cl. 315—72)

The present invention relates to electric control circuits of the type which respond to the application of an exciting potential to provide intermittent energizing of an indicator lamp or buzzer.

Controls of this general type are common in motor vehicles and are used, for example, as turning indicators in such vehicles. In response to a manual switch operation, either one set of indicator lamps on one side of the vehicle or another set on the other side are intermittently energized to indicate either an intended left turn or a right turn.

These controls also find general utility as warning lamps in conjunction with control panels on aircraft or in other installations. For such applications, the happening of a monitored condition causes a sensing switch element to close to complete an energizing circuit to the control unit. The closure of the energizing circuit causes a lamp on the control panel to be turned on and off. The lamp, therefore, produces a flashing signal which quickly draws the attention to the operator to the fact that the monitored condition has occurred.

Thermal units have been used in the past to constitute the control elements for the control circuits described in the preceding paragraphs. These units operate in known manner periodically to make and break an energizing circuit to an indicator lamp upon the completion of an energizing circuit to the thermal unit. The arrangement is such that the completion of the energizing circuit causes a current to flow through the thermal unit to heat the thermal unit. The resulting increase in temperature of the unit causes it to expand and break the energizing circuit. The unit then cools down and again makes the energizing circuit to repeat the cycle. An indicator lamp is also connected in the energizing circuit, and this lamp is controlled by the thermal unit to be intermittently energized.

Such thermal control units have operated satisfactorily under normal ambient temperature conditions. However, present conditions have arisen which require flasher control systems to operate under temperature conditions ranging, for example, from —55° F. to +160° F. Such ambient temperature requirements arise, for example, for the flasher control systems when used on an aircraft. It is evident that it would be extremely difficult to design such control circuits to use thermal control units as their actuating elements.

Attempts have been made in the past to construct satisfactory flasher control circuits which are controlled by the charge and discharge of a capacitor. It is evident that a satisfactory unit of this type is not as susceptible to wide variations in ambient temperature as the thermal control type.

One serious problem, however, that has been encountered in the design of capacitor type flasher control circuits has been in the provision of satisfactory "off" times and "on" times for the controlled indicator lamp. It was found generally that when the circuit was designed to provide an "on" time of a desired duration, the "off" time was too short. Alternately, if the "off" time was designed to the desired interval, the "on" time was found to be too long.

The circuit of the present invention solves the problem outlined in the preceding paragraph, and this is achieved inter alia, first by the provision of a pair of capacitors in the control circuit; second by the provision of a common charge path to the capacitors, and third by the provision of individual discharge paths for the capacitors. By this expedient, the charge time of the capacitors may be made to be approximately equal to the discharge time, or these two times may be made to bear any desired ratio merely by the proper choice of the relative values of the two capacitors.

In the circuit of the invention, during a charge cycle of the capacitors, the indicator lamp is on, and during a discharge cycle it is off. As noted above, these two cycles can be conveniently controlled merely by choosing the proper relative values of the capacitors. The cycles, therefore, can be easily adjusted to have any desired time relation. The control circuit of the present invention also uses a common resistance in series with the capacitors to reduce the voltage across the capacitors to a low value at the beginning of the charging cycle. This low voltage is insufficient to actuate the control for the indicator lamp. However, during the charging cycle, the voltage across the capacitors gradually rises as the charging current into them decreases, and this voltage continues to rise until it reaches the threshold of actuation of the control for the indicator lamp. The circuit to the capacitors is then broken and they begin to discharge until the voltage across them drops to a level that causes the control for the indicator lamp to be deenergized. The energizing circuit is then completed once more, and the cycle is repeated.

The resistor referred to above, additionally serves as a limiting impedance for the capacitors so that there are no problems with respect to surge voltages. This enables the capacitors to have a relatively small power rating and a corresponding small size. This is most advantageous in many applications where space is at a premium and also where cost considerations are involved.

The flashing control circuit of the invention also includes in one embodiment, a relay having its energizing winding connected across the capacitor. The relay is energized when the voltage across the capacitors reaches the actuating threshold referred to above. The energizing of the relay causes it to break a pair of normally closed contacts to break the energizing circuit to the indicator lamp and to the capacitors. The capacitors now start the discharge and the voltage across them drops to a value at which the relay is deenergized. This causes the contacts of the relay to close and reinitiate the cycle.

The use of a relay described above with normally closed contacts in the flasher circuit is advantageous in that the control circuit incorporates a fail-safe feature. This is most important in warning systems. If any defect should occur in the control system itself, the relay becomes deenergized and the indicator lamp glows continually. Therefore, with this feature, so long as the indicator lamp is off, the operator has a material degree of assurance that the circuit is in an operating condition and that it will properly indicate the particular hazardous condition monitored by it.

Another important feature of the flasher control circuit of the invention is the fact that it is inherently simple in its construction. This enables the system to be small in size and inexpensive in cost.

In the drawings:

Figure 1 is a schematic wiring diagram of one embodiment of the control circuit of the present invention;

Figure 2 illustrates certain curves which are useful in explaining the operation of the circuit of Figure 1;

Figure 3 is a substantially full scale plan view of a mechanical flasher unit constructed to incorporate the structure of Figure 1; and Figure 4 is a side elevational view of the unit of Figure 3.

The control circuit of Figure 1 includes a pair of input terminals 10. To operate the unit, a uni-directional voltage of, for example, 28 volts is introduced across these input terminals. As noted above, this voltage may be under the control of a sensing switch element to be introduced to the input terminals upon the occurrence of a monitored hazardous occurrence.

One of the input terminals 10 is connected to ground or to any appropriate common return circuit. The other input terminal 10 is connected to the fixed contact 15 of a normally closed relay switch 12. The armature 13 of the relay switch 12 is controlled by an energizing winding 14, and the switch is opened whenever the winding is energized. An appropriate indicating lamp 16 is connected between the armature 13 of the relay switch 12 and ground. When a 28 volt uni-directional voltage is used, this indicator lamp will have corresponding ratings to glow with desired brilliance when 28 volts is applied across its terminals.

A resistor 18 of, for example, 5 kilo-ohms has one terminal connected to the armature 13 of the relay switch 12. A capacitor 20 is connected between the other terminal of the resistor 18 and ground, so that the resistor and the capacitor are connected in series between the armature of the relay switch 12 and ground. The capacitor 20, may, for example, have a capacitor of approximately 50 microfarads. An asymmetrical conductive device, such as a diode 22 of any known construction and a capacitor 24 are connected in series across the capacitor 20. The diode may, for example, be a usual two electrode vacuum tube, or it may be any well known type of crystal rectifier exhibiting asymmetrical conductive characteristics. The capacitor 24, may, for example, have a capacitor of 8 microfarads. The diode 22 is connected into the circuit in such a manner that its cathode is connected to the capacitor 24 and its anode is connected to the common junction of the resistor 18 and the capacitor 20.

The energizing relay winding 14 has one terminal connected to the common junction of the diode 22 and the other terminal of this winding is grounded.

When the exciting voltage is first introduced across the input terminals 10, and because the relay switch 12 is closed, the indicator lamp 16 immediately glows. Also, current flows down through the resistor 18 into the capacitor 20, and through the resistor and the diode 22 into the capacitor 24. Both the capacitors 20 and 24 are assumed to be in their discharge state, so that a relatively high charging current flows initially into these capacitors.

The relatively high charging current flow produces a voltage drop across the resistor 18 such that the net voltage across the relay winding 14 is insufficient to produce sufficient current flow in the winding to enable it to create a magnetic field of sufficient intensity to attract the armature 13 of the switch 12 away from the fixed contact 15 to open the switch.

However, after a time interval depending upon the resistance of the resistor 18 and the capacities of the capacitors 20 and 24, the charging current into the capacitors drops to such a value that the voltage introduced across the energizing winding 14 is sufficient to cause that winding to open the relay switch 12. When this occurs, the indicator lamp 16 is deenergized, and the energizing circuit to the capacitors 24 and 20 is broken. The capacitors now begin to discharge.

The value of the capacitors 20 and 24, and the resistor 18 are chosen so that the charging time is such that the lamp 16 will be on for a selected interval of time. As noted above, however, without the provisions of the present invention, the choice of capacity to provide a desired "on" time for the lamp 16 would otherwise result in an insufficient "off" time. That is, the capacitor would discharge too rapidly so that the lamp would be almost instantaneously energized once more.

With the circuit disclosed in Figure 1, the capacitor 20 discharges into the resistor 18 and through the indicator lamp 16, and it also discharges through the diode 22 and through the winding 14. Therefore, the capacitor 20 has two discharge paths and this capacitor is able to discharge relatively quickly. However, the diode 22 prevents the capacitor 24 from discharging back through the portion of its charge path and through the lamp 16. The capacitor 24 can discharge only through the winding 16. Therefore, although both the capacitors 20 and 24 cooperates to lengthen the charging cycle, this cooperation does not result in a rapid discharge cycle. The latter feature is achieved by separating the discharge paths of the two capacitors.

Therefore, after the voltage across the capacitors has reached the level which energizes the relay winding 14, the capacitors go into a discharge cycle and the lamp 16 is turned off. When the charge in the capacitors has been discharged sufficiently so that the voltage across the capacitors drops to the level at which the magnetic field created by the winding 14 releases the armature of the switch 12, the relay switch closes to reinitiate a charging cycle for the capacitors and to turn on the lamp 16. Therefore, the application of a direct or uni-directional voltage across the terminals 10 causes the lamp 16 to be intermittently energized so that the lamp may provide a flashing indication.

The charging and discharging cycle of the system are represented graphically in Figure 2. The curves of this figure are plotted on a voltage ordinate axis and on a time coordinate axis. When the voltage is first applied across the input terminals 10, the capacitors 20 and 24 begin to charge, as described above. The voltage across the capacitor 24 is represented by the curve 50. The threshold voltage $V_1$ represents the level at which the relay winding will release the armature of the normally closed switch 12. However, this level, of course, is lower than the level required to open the armature because the armature is normally spaced from the winding pole piece when the relay switch is closed. Therefore, the voltage across the capacitor 24 must rise to a threshold value $V_2$, and this occurs at a time $T_2$ after the introduction of the voltage to the input terminals 10.

At the time $T_2$, the relay winding 14 is energized and the relay switch 12 opens. This immediately deenergizes the lamp 16, and breaks the energizing circuit to the capacitors 20 and 24. The voltage across the capacitor 24 now falls off as represented by the curve 52. When the voltage drops to the value $V_1$, which occurs at a time $T_3$, the relay winding releases the armature to allow the relay switch 12 to close so that a second cycle is initiated.

The charging voltage across the capacitors 24 during the second cycle is indicated by the curve 50', and the discharging voltage across the capacitor 24 during this second cycle is represented by the curve 52'. It will be understood that as long as a voltage is introduced across the terminals 10, the discharge and charge voltages will appear cyclically across the capacitors between the threshold $V_1$ and $V_2$.

The charging time is determined by the sum of the values of the capacitors 20 and 24. Therefore, by changing the ratio of the values the capacitors 20 and 24, but holding the sum constant, any desired ratio of "on" and "off" times for the lamp 16 may be achieved. In the illustration of Figure 2, the "on" time $T_1$ for the lamp is made essentially equal to the "off" time $T_2$. However, by increasing the value of the capacitor 20 and by decreasing the value of the capacitor 24, the discharge path 52 can be varied as shown by the dashed lines 52a, 52b, 52c and 52d. That is, the capacitors may be made to discharge in any desired time interval, even though the charging time interval is held constant, the only requirement being that the sum of the capacitors be held constant. Therefore, by the suitable choice of the capacitors 20 and 24, any desired ratio between the "on" and "off" times of the lamp 16 can be achieved.

The mechanical unit of Figures 3 and 4 is housed on a chassis 100 which may, for example, be composed of a small thin block of insulating material such as Bakelite. The relay winding 14 is mounted on an upright bracket 102 which is secured to the block 100 by a pair of screws 104 extending through the bottom of the block. The winding 14 has a core 105 which terminates in a pole piece adjacent the armature 13 of the relay switch 12.

The armature 13 is pivoted in the upright bracket 102. A spring 106 extending from the armature to a screw 108 on the bracket 102 normally biases the armature away from the core 15. The screw 108 also supports a terminal 109, and a coiled flexible lead 111 connects this terminal to the armature 13. The fixed contact 15 of the relay switch 12 is supported on an upright bracket 110 which is supported on the block 100 by a pair of screws 112 extending through the block. A metallic end piece 114 is secured to one end of the block 100, and a series of leads 116 extend through an insulated grommet 118 in the end piece. Other components such as the resistor 18, the diode 22, and the capacitors 20 and 24 are suitably supported on the base 100 as shown. An appropriate housing for the unit (not shown) may be slipped over the block 100 and into a cooperating fit with the end piece 114. The purpose of the third lead of the leads 116 is to provide a connection with the indicating lamp 16 which is usually mounted externally of the unit.

It will be seen, therefore, that the indicator lamp 16 is connected to the input terminals 10 through the normally closed relay switch 12 to provide the fail-safe feature referred to and described previously. Also, the unit is constructed to incorporate a pair of capacitors with separate individual discharge paths so that the intervals in which the lamp is "on" and the intervals in which it is "off" may be controlled and adjusted in a very simple manner. Also, the resistor 18 additionally serves as a surge voltage limiting resistor for the capacitors so that they may have a relatively small size. As illustrated in Figures 3 and 4, the system may be assembled to constitute a compact and a relatively inexpensive unit.

Although the now preferred embodiment of the present invention has been shown and described herein, it is to be understood that the invention is not to be limited thereto, for it is susceptible to changes in form and detail within the scope of the appended claims.

We claim:

1. An electric control circuit including, a relay energizing winding, a pair of relay contacts associated with said winding and adapted to open when said winding is energized, a pair of input terminals, resistance means and first capacitance means both connected in series with said relay contacts across said input terminals, asymmetrical conductive means and a second capacitance means connected in series across said first capacitance means, with said second capacitance means being connected across said energizing winding, and indicator means connected across said resistance means and said first capacitance means.

2. An electric control circuit including, a pair of input terminals, a relay energizing winding, a pair of relay contacts associated with said winding and adapted to open when said winding is energized, indicator means connected in series with said relay contacts across said input terminals, resistor means, first capacitor means connected in series with said resistor means across said indicator means, asymmetrical conductive means, second capacitor means connected in series with said asymmetrical conductive means across said first capacitor means, and said relay energizing winding being connected across said second capacitor means.

3. An electric flashing control circuit including, a pair of input terminals, a relay energizing winding, a pair of relay contacts associated with said winding and adapted to open when said winding is energized, an electric indicating lamp connected in series with said relay contacts across said input terminals, a common resistor, a first capacitor connected in series with said resistor across said lamp, a diode having an anode and a cathode, the anode of said diode being connected to the common junction of said resistor and said first capacitor, a second capacitor connected to the cathode of said diode and connected in series with said diode across said first capacitor, and said relay energizing winding being connected across said second capacitor.

4. An electric control circuit including, indicator means, a capacitive network for controlling the energizing of said indicator means, a plurality of capacitor means included in said network for causing said indicator means to be energized when the charge on at least one of the capacitor means of said plurality of capacitor means assumes a first level and to be deenergized when the charge on at least one of the capacitor means of said plurality of capacitor means assumes a second level, means for intermittently introducing a direct voltage across the plurality of capacitor means to provide a charge cycle and a discharge cycle for said plurality of capacitor means, and means including diode means for providing different paths for different individual ones of said capacitor means in one of said cycles and for providing a common path for the capacitor means in the other of said cycles.

5. An electric control circuit including, indicator means, a capacitive network for controlling the energizing of said indicator means, a pair of capacitors included in said capacitive network for causing said indicator means to be energized when the charge on one of said capacitors exceeds a certain level, means for intermittently introducing a direct voltage across the pair of capacitors to provide a charge cycle and a discharge cycle for said capacitors, and means including diode means for causing said capacitors to charge through a common path during said charge cycle and to discharge through different paths during said discharge cycle.

6. An electric control circuit including, indicator means, a network for controlling the energizing of said indicator means, said network including a resistor series connected with a pair of shunt-connected capacitors across said indicator means, means for intermittently introducing a direct voltage across the shunt-connected capacitors and the resistor to provide for the charging and discharging of said capacitors, and a diode interposed between said resistor and one of said capacitors to cause said capacitors to charge through a common path and to discharge through different paths.

7. An electric control circuit including, indicator means, a network for controlling the energizing of said indicator means, said network including a resistor series-connected with a pair of shunt-connected capacitors across said indicator means, relay means for controlling the charge and discharge of said capacitors, said relay means having an energized winding connected across one of said capacitors and having a pair of normally closed contacts connected in series with said control network, and a diode interposed between said one of said capacitors and said resistor, said diode being connected with a polarity to cause said one of said capacitors to discharge solely through said energizing winding.

References Cited in the file of this patent

UNITED STATES PATENTS

| | | |
|---|---|---|
| 2,006,737 | Gessford | July 2, 1935 |
| 2,632,133 | McNulty | Mar. 17, 1953 |
| 2,669,677 | Entwisle | Feb. 16, 1954 |
| 2,785,346 | Large | Mar. 12, 1957 |